(12) United States Patent
Boom et al.

(10) Patent No.: US 7,219,904 B1
(45) Date of Patent: May 22, 2007

(54) LUGGAGE CART ASSEMBLY

(76) Inventors: Ernest E. Boom, P. O. Box 6081, Vacaville, CA (US) 95696; Ella Boom, P. O. Box 6081, Vacaville, CA (US) 95696

( * ) Notice: Subject to any disclaimer, the term of this patent is extended or adjusted under 35 U.S.C. 154(b) by 54 days.

(21) Appl. No.: 11/159,631

(22) Filed: Jun. 24, 2005

(51) Int. Cl.
*B62B 3/04* (2006.01)

(52) U.S. Cl. ............ 280/79.3; 280/79.11; 280/47.35

(58) Field of Classification Search ............ 280/79.11, 280/79.2, 79.3, 87.01, 87.021, 47.34, 47.35
See application file for complete search history.

(56) References Cited

U.S. PATENT DOCUMENTS

| | | | | |
|---|---|---|---|---|
| 2,533,324 A | * | 12/1950 | Mendle | 211/206 |
| 2,774,609 A | * | 12/1956 | Winger | 280/79.11 |
| 2,793,764 A | | 5/1957 | Stork | |
| 2,969,245 A | * | 1/1961 | Wilson | 280/641 |
| 3,689,098 A | * | 9/1972 | Rubin | 280/33.998 |
| 3,705,731 A | * | 12/1972 | Berchak | 280/651 |
| 4,165,088 A | | 8/1979 | Nelson | |
| D294,760 S | * | 3/1988 | Vanderdoes, Sr. | D34/17 |
| 5,090,725 A | * | 2/1992 | Feldner | 280/651 |
| D329,727 S | * | 9/1992 | DeWitt | D34/23 |
| 5,190,305 A | * | 3/1993 | Putman | 280/79.3 |
| 5,556,118 A | * | 9/1996 | Kern et al. | 280/47.16 |
| 5,738,365 A | * | 4/1998 | McCarthy | 280/651 |
| 6,793,223 B2 | * | 9/2004 | Ondrasik et al. | 280/47.35 |
| 6,923,458 B2 | * | 8/2005 | Hooper et al. | 280/79.3 |

* cited by examiner

*Primary Examiner*—J. Allen Shriver

(57) ABSTRACT

A luggage cart assembly includes a base that has a top side, a bottom side, a first end edge, a second end edge, a first lateral edge and a second lateral edge. A plurality of wheels is rotatably coupled to the bottom side. The top side has a plurality of wells extending therein. Each of the first and second side edges have two wells positioned adjacent thereto. A plurality of posts each has a first end and a second end and a bend positioned between the first and second ends. Each of the first ends is positionable into one of the wells such that second ends of adjacent posts extend toward each other. A pair of fastening members removably secures adjacent ones of the second ends together. A rod has a pair of opposite end. Each of the opposite ends is removably attached to one of the fastening members.

7 Claims, 3 Drawing Sheets

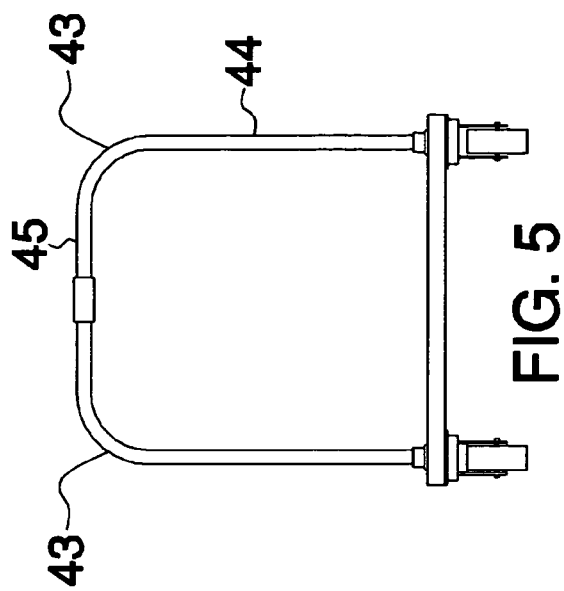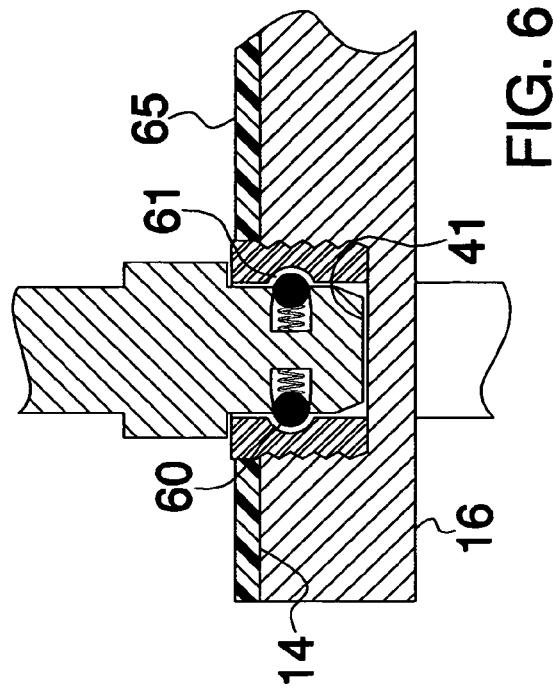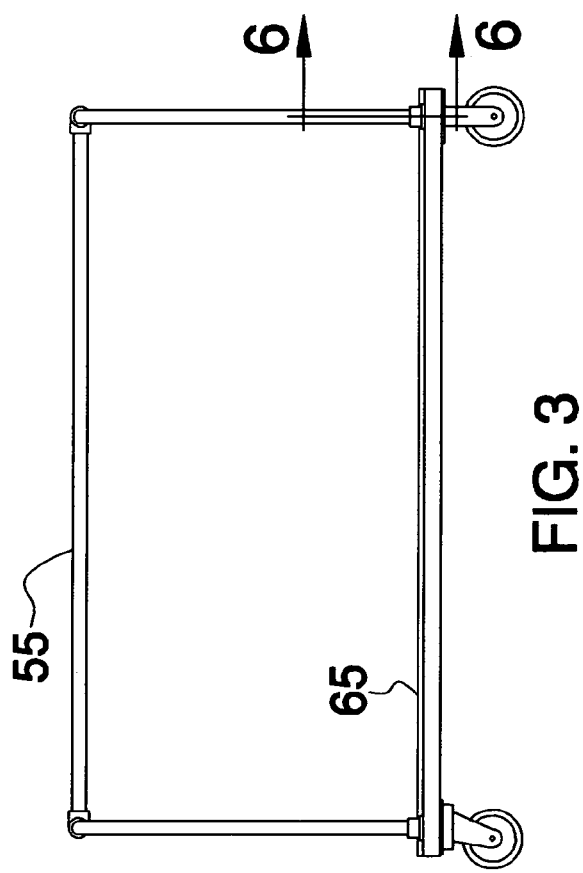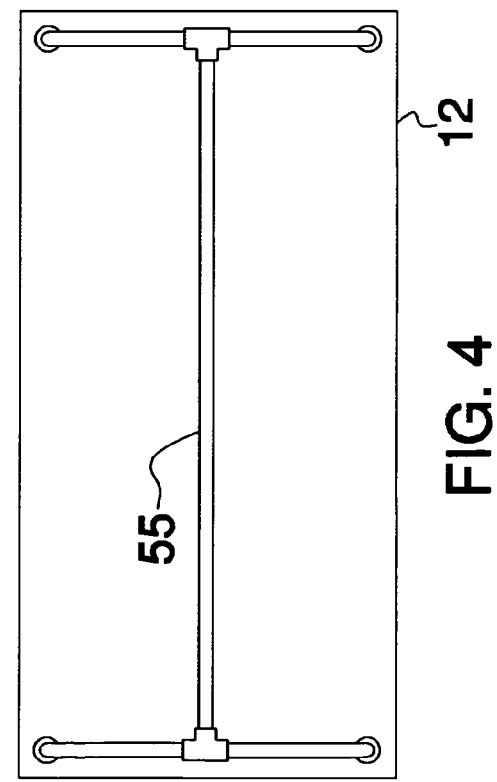

LUGGAGE CART ASSEMBLY

BACKGROUND OF THE INVENTION

1. Field of the Invention

The present invention relates to cart devices and more particularly pertains to a new cart device for aiding a person in transporting their luggage from a vehicle and into a hotel or into their home.

2. Description of the Prior Art

The use of cart devices is known in the prior art. U.S. Pat. No. 5,090,725 describes a device for supporting garments in a vertical orientation. Another type of cart device is U.S. Pat. No. 2,793,764 which also describes a device adapted for supporting garments in a vertical orientation above a ground surface. Still yet another such device is found in U.S. Pat. No. 3,705,731.

While these devices fulfill their respective, particular objectives and requirements, the need remains for a device that allows a person to transport their own clothing and luggage from a vehicle and into a hotel room. This will save a person money as well as provide a method for transporting luggage when a bellhop is not available. Additionally, the device should be collapsible so that it is easily storable within a vehicle and may be stored within a dwelling when not in use. Further, the device may be used for transporting luggage into a dwelling and thereafter storing the luggage when the luggage is not being used.

SUMMARY OF THE INVENTION

The present invention meets the needs presented above by generally comprising a base that has a top side, a bottom side, a first end edge, a second end edge, a first lateral edge and a second lateral edge. A plurality of wheels is rotatably coupled to the bottom side. The top side has a plurality of wells extending therein. A first well and a second well of the plurality of the wells is positioned adjacent to the first end edge and a third well and a fourth well of the plurality of wells is positioned adjacent to the second side edge. The first and second wells are positioned apart a distance equal to a distance between the third and fourth wells. A plurality of posts is provided. Each of the posts has a first end and a second end. Each of the posts has a bend therein positioned nearer the second ends than the first ends so that each of the posts includes a first portion positioned between the first ends and the bends and a second portion positioned between the second ends and the bends. The bends are substantially equal to 90 degrees. Each of the first ends is removably positionable into of the wells. The second ends of the posts positioned in the first and second wells extending toward each other. The second ends of the posts positioned in the third and fourth wells extend toward each other. A pair of fastening members removably secures adjacent ones of the second ends together. A rod has a pair of opposite end. Each of the opposite ends is removably attached to one of the fastening members.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side view of the present invention.

FIG. 4 is a top view of the present invention.

FIG. 5 is a front view of the present invention.

FIG. 6 is a cross-sectional view taken along line 6—6 of FIG. 3 of the present invention.

DESCRIPTION OF THE PREFERRED EMBODIMENT

Figure 1:
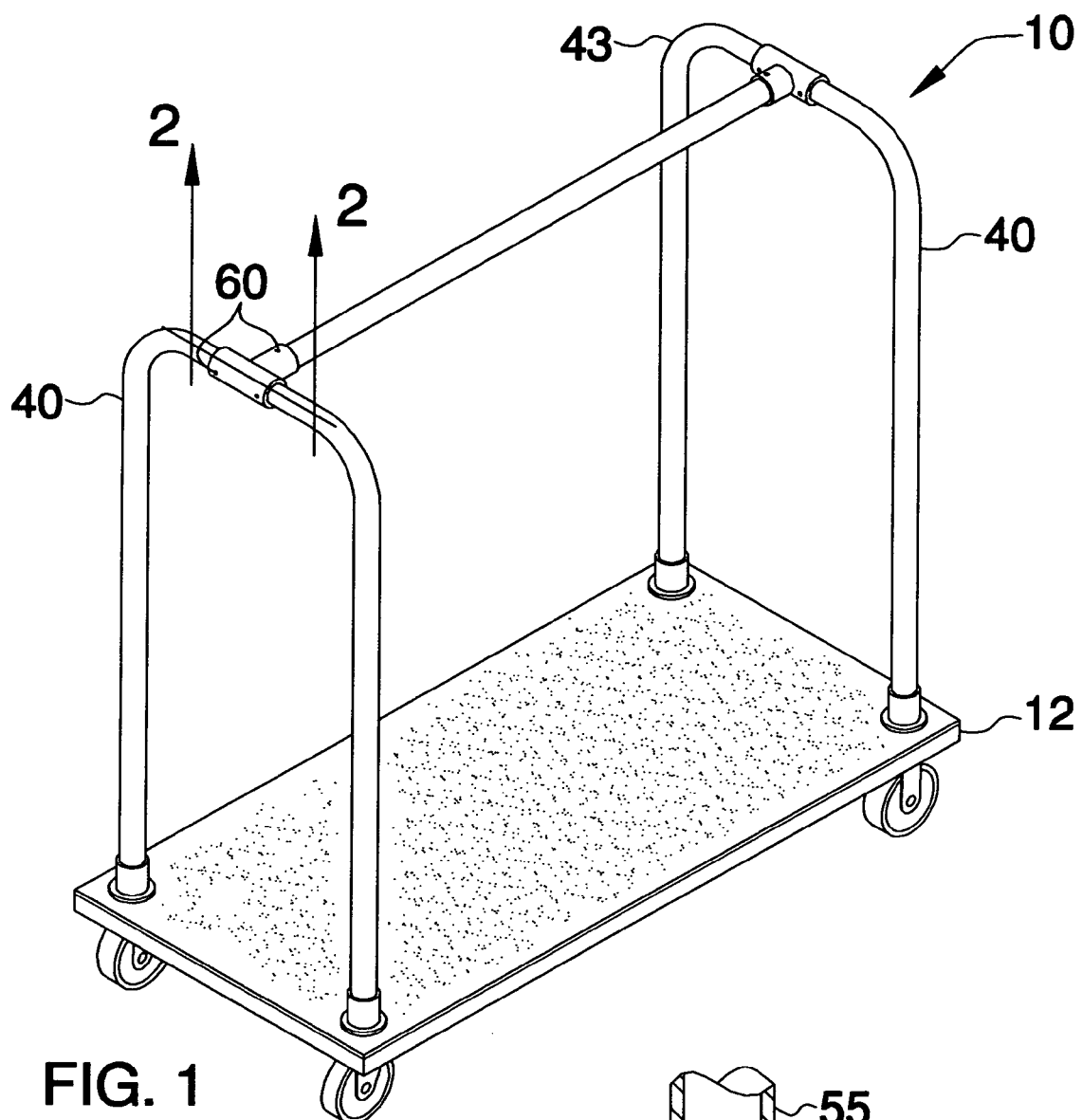
FIG. 1 is a perspective view of a luggage cart assembly according to the present invention.

With reference now to the drawings, and in particular to FIGS. 1 through 8 thereof, a new cart device embodying the principles and concepts of the present invention and generally designated by the reference numeral 10 will be described.

As best illustrated in FIGS. 1 through 8, the luggage cart assembly 10 generally comprises a base 12 that has a top side 14, a bottom side 16, a first end edge 18, a second end edge 20, a first lateral edge 22 and a second lateral edge 24. Each of a plurality of wheels 26 is rotatably coupled to the bottom side 16. The top side 14 has a plurality of wells extending therein. A first well 31 and a second well 32 of the plurality of the wells is positioned adjacent to the first end edge 18. A third well 33 and a fourth well 34 of the plurality of wells is positioned adjacent to the second side edge 20. The first 31 and second 32 wells are positioned apart from each other a distance equal to a distance between the third 33 and fourth 34 wells. The first 31 and second 32 wells are spaced apart generally between 22 inches and 26 inches. The base 12 has a width from the first lateral edge 22 to the second lateral edge 24 generally between 28 inches and 32 inches and a length from the first end edge 18 to the second end edge 20 generally between 40 inches and 44 inches. The base 12 is comprised of a plastic material.

A plurality of posts 40 is provided. Each of the posts 40 has a first end 41 and a second end 42. Each of the posts 40 has a bend 43 therein positioned nearer the second ends 42 than the first ends 41 so that each of the posts includes a first portion 44 positioned between the first ends 41 and the bends 43 and a second portion 45 positioned between the second ends 42 and the bends 43. The bends 43 are substantially equal to 90 degrees. Each of the first ends 41 is removably positionable into of the wells 31–34. The second ends 42 of the posts 40 that are positioned in the first 31 and second 32 wells extend toward each other. The second ends 42 of the posts 40 that are positioned in the third 33 and fourth 34 wells extend toward each other. Each of the first portions 44 has a height generally between 46 inches and 50 inches and each of the second portions 45 has a length generally between 9 inches and 11 inches.

Figure 2:
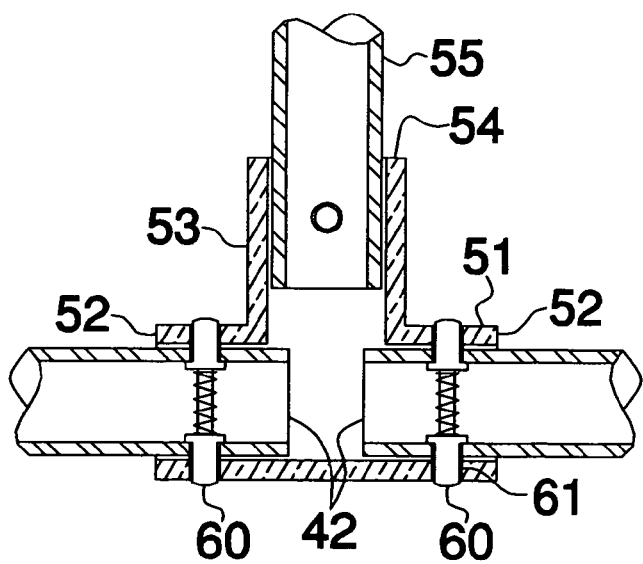
FIG. 2 is a cross-sectional view taken along line 2—2 of FIG. 1 of the present invention.
Figure 7:
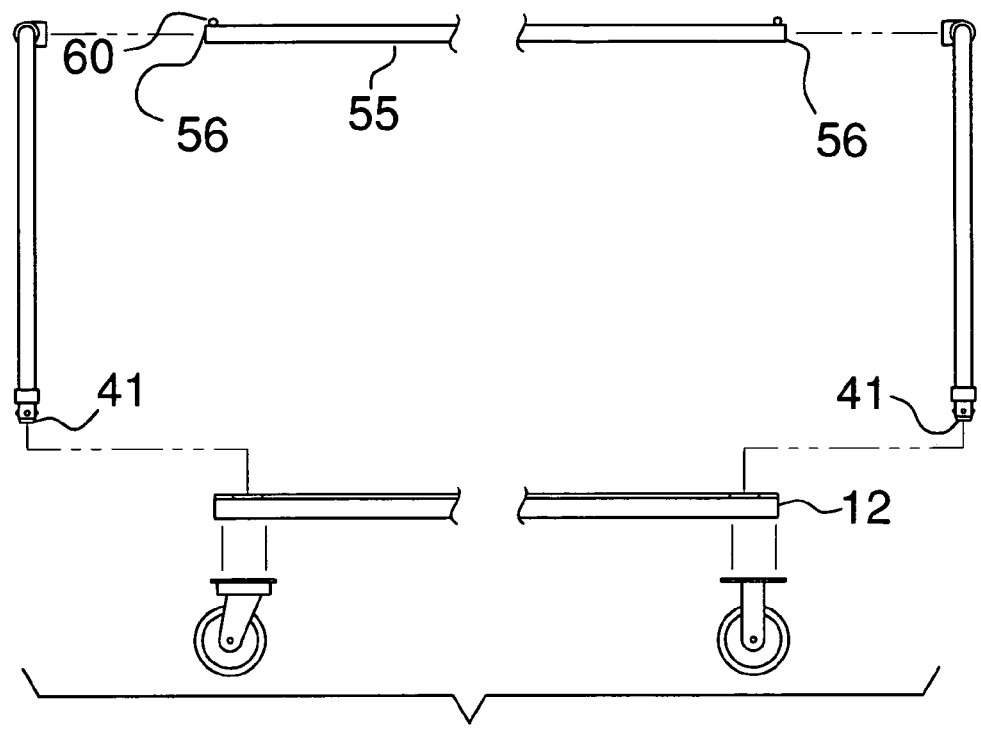
FIG. 7 is a side expanded view of the present invention.
Figure 8:
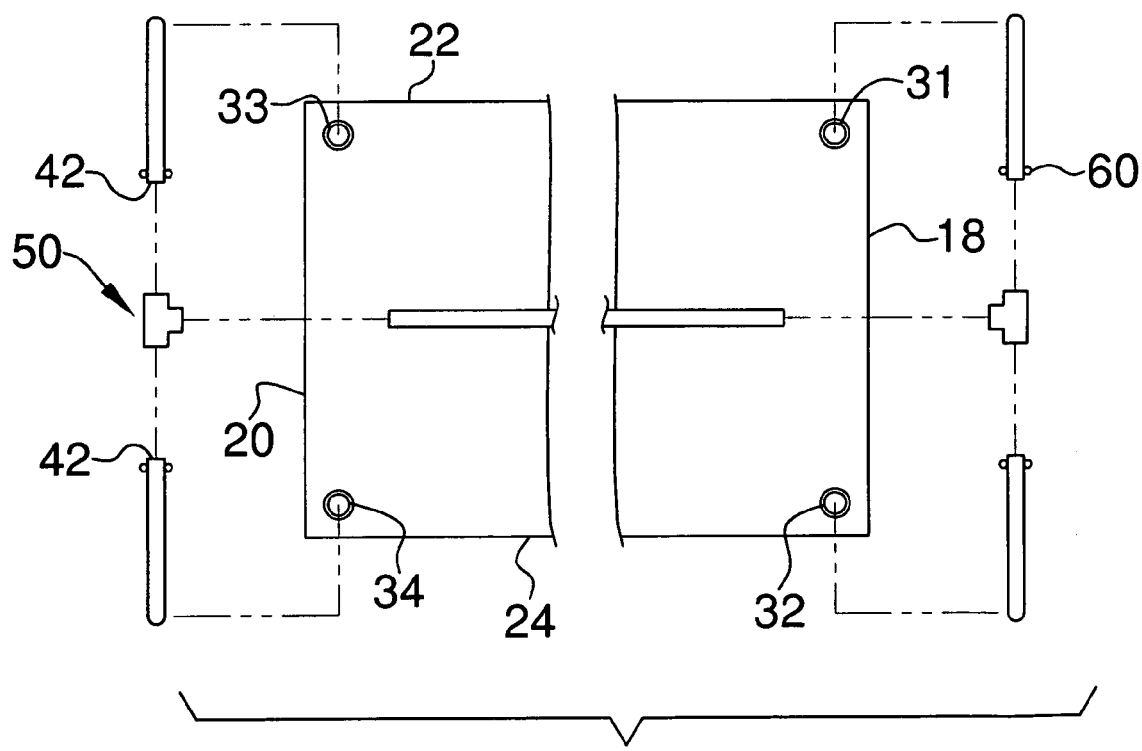
FIG. 8 is a top expanded view of the present invention.

A pair of fastening members 50 is provided. Each of the fastening members 50 includes a tube 51 that has a pair of open ends 52 and a cylinder 53 that is attached to and extends away from a peripheral wall of the tube 51. The cylinders 53 are perpendicular with respect to a corresponding one of the tubes 51. The cylinders 53 each have an open free end 54. Each of the second ends 42 of the posts 40 is removably extendable into one of the open ends 52 of the tube so that adjacent ones of the second ends 42 are attached together as shown in FIGS. 1 and 2. A rod 55 has a pair of opposite ends 56. Each of the opposite ends 56 is removably positioned in one of the free ends 54 so that the rod 55 is attached to the posts 40.

A plurality of couplers 60 is mounted in each of the posts 40 and is positioned adjacent to the first 41 and second 42 ends of the posts 40. A plurality of couplers 60 is also mounted in the rod 55. The couplers 60 in the posts 40 are configured to removably secure the posts 40 to the base 12 and the fastening members 50. The couplers 60 in the rod 55 are configured to removably secure the rod to the fastening members 50. Each of the couplers 60 includes an outwardly biased catch that is removably extendable into notches 61 or openings positioned in each of the fastening members 50 and in peripheral walls of the wells 31–34.

A carpet material 65 is attached to and substantially covers the top side 14 of the base 12. The carpet material 65 is preferably an all weather type of carpeting material.

In use, the assembly 10 is attached together as described above and as shown in the figures when needed for transporting large amounts of luggage. The collapsible nature of the assembly 10 allows a person to bring the assembly 10 with them as they travel, particularly if they are traveling by vehicle. Additionally, the assembly 10 may be used for storage purposed in a person's dwelling and for moving luggage between a vehicle and the dwelling.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A clothing and luggage transportation device, said device comprising:
    a base having a top side, a bottom side, a first end edge, a second end edge, a first lateral edge and a second lateral edge, a plurality of wheels being rotatably coupled to said bottom side, said top side having a plurality of wells extending therein, a first well and a second well of said plurality of said wells being positioned adjacent to said first end edge, a third well and a fourth well of said plurality of wells being positioned adjacent to said second side edge, said first and second wells being positioned apart a distance equal to a distance between said third and fourth wells;
    a plurality of posts, each of said posts having a first end and a second end, each of said posts having a bend therein positioned nearer said second ends than said first ends such that each of said posts includes a first portion positioned between said first ends and said bends and a second portion positioned between said second ends and said bends, said bends being substantially equal to 90 degrees, each of said first ends being removably positionable into one of said wells, said second ends of said posts positioned in said first and second wells extending toward each other, said second ends of said posts positioned in said third and fourth wells extending toward each other;
    a pair of fastening members removably securing adjacent ones of said second ends together, each of said fastening members including a tube having a pair of open ends and a cylinder being attached to and extending away from a peripheral wall of said tube, said cylinders being perpendicular with respect to a corresponding one of said tubes, said cylinders having an open free end, each of said second ends of said posts being removably extendable into one of said open ends of said tube such that adjacent ones of said second ends are attached together, each of said opposite ends being removably positioned in one of said free ends;
    a rod having a pair of opposite ends, each of said opposite ends being removably attached to one of said fastening members; and
    a plurality of couplers being mounted in each of said posts and being positioned adjacent to said first and second ends of said posts, a plurality of couplers being mounted in said rod, each of said couplers being configured to removably secure said posts to said base and said fastening members and configured to removably secure said rod to said fastening members.

2. The device according to claim 1, wherein said first and second wells being spaced apart generally between 22 inches and 26 inches.

3. The device according to claim 2, wherein said base has a width from said first lateral edge to said second lateral edge generally between 28 inches and 32 inches, said base having a length from said first end edge to said second end edge generally between 40 inches and 44 inches.

4. The device according to claim 1, wherein each of said first portions having a height generally between 46 inches and 50 inches, each of said second portions having a length generally between 9 inches and 11 inches.

5. The device according to claim 1, wherein each of said couplers including an outwardly biased catch being removably extendable into notches positioned in each of said fastening members and peripheral walls of said wells.

6. The device according to claim 1, further including a carpet material being attached to and substantially covering said top side of said base.

7. A clothing and luggage transportation device, said device comprising:
    a base having a top side, a bottom side, a first end edge, a second end edge, a first lateral edge and a second lateral edge, a plurality of wheels being rotatably coupled to said bottom side, said top side having a plurality of wells extending therein, a first well and a second well of said plurality of said wells being positioned adjacent to said first end edge, a third well and a fourth well of said plurality of wells being positioned adjacent to said second side edge, said first and second wells being positioned apart a distance equal to a distance between said third and fourth wells, said first and second wells being spaced apart generally between 22 inches and 26 inches, said base having a width from said first lateral edge to said second lateral edge generally between 28 inches and 32 inches, said base having a length from said first end edge to said second end edge generally between 40 inches and 44 inches, said base being comprised of a plastic material;

a plurality of posts, each of said posts having a first end and a second end, each of said posts having a bend therein positioned nearer said second ends than said first ends such that each of said posts includes a first portion positioned between said first ends and said bends and a second portion positioned between said second ends and said bends, said bends being substantially equal to 90 degrees, each of said first ends being removably positionable into of said wells, said second ends of said posts positioned in said first and second wells extending toward each other, said second ends of said posts positioned in said third and fourth wells extending toward each other, each of said first portions having a height generally between 46 inches and 50 inches, each of said second portions having a length generally between 9 inches and 11 inches;

a pair of fastening members, each of said fastening members including a tube having a pair of open ends and a cylinder being attached to and extending away from a peripheral wall of said tube, said cylinders being perpendicular with respect to a corresponding one of said tubes, said cylinders having an open free end, each of said second ends of said posts being removably extendable into one of said open ends of said tube such that adjacent ones of said second ends are attached together;

a rod having a pair of opposite ends, each of said opposite ends being removably positioned in one of said free ends such that said rod is attached to said posts;

a plurality of couplers being mounted in each of said posts and being positioned adjacent to said first and second ends of said posts, a plurality of couplers being mounted in said rod, each of said couplers being configured to removably secure said posts to said base and said fastening members and configured to removably secure said rod to said fastening members, each of said couplers including an outwardly biased catch being removably extendable into notches positioned in each of said fastening members and peripheral walls of said wells; and a carpet material being attached to and substantially covering said top side of said base.

* * * * *